(12) United States Patent
Markopoulos

(10) Patent No.: US 12,029,158 B1
(45) Date of Patent: Jul. 9, 2024

(54) MULCHING LAWN MOWER BLADE

(71) Applicant: Andreas M. Markopoulos, Muskego, WI (US)

(72) Inventor: Andreas M. Markopoulos, Muskego, WI (US)

( * ) Notice: Subject to any disclaimer, the term of this patent is extended or adjusted under 35 U.S.C. 154(b) by 0 days.

(21) Appl. No.: 18/441,238

(22) Filed: Feb. 14, 2024

(51) Int. Cl.
*A01D 34/73* (2006.01)
*A01D 34/00* (2006.01)
*A01D 34/63* (2006.01)
*A01D 101/00* (2006.01)

(52) U.S. Cl.
CPC .......... *A01D 34/73* (2013.01); *A01D 34/005* (2013.01); *A01D 34/63* (2013.01); *A01D 2101/00* (2013.01)

(58) Field of Classification Search
CPC ........ A01D 34/73; A01D 34/63; A01D 34/64; A01D 34/005
See application file for complete search history.

(56) References Cited

U.S. PATENT DOCUMENTS

| | | | | |
|---|---|---|---|---|
| 3,385,043 A | * | 5/1968 | Seymore | A01D 34/76 56/503 |
| 4,292,791 A | * | 10/1981 | Lalonde | A01D 34/005 56/255 |
| 5,035,108 A | * | 7/1991 | Meyer | A01D 34/71 56/320.2 |
| 5,209,052 A | * | 5/1993 | Carroll | A01D 34/73 56/DIG. 17 |
| 5,259,176 A | | 11/1993 | Kahamura et al. | |
| 5,321,940 A | | 6/1994 | Peterson | |
| 5,353,581 A | | 10/1994 | Rouse et al. | |
| 5,669,213 A | * | 9/1997 | Britton | A01D 34/005 56/DIG. 17 |
| 5,894,717 A | * | 4/1999 | Yamashita | A01D 34/005 56/320.1 |
| 6,145,290 A | * | 11/2000 | Sullivan | A01D 34/005 56/255 |
| 11,490,565 B2 | * | 11/2022 | Kurihara | A01D 34/826 |

FOREIGN PATENT DOCUMENTS

EP    1498018 A1 *  1/2005  ............. A01D 34/73

* cited by examiner

*Primary Examiner* — Alicia Torres
(74) *Attorney, Agent, or Firm* — Donald J. Ersler

(57) ABSTRACT

A mulching lawn mower blade preferably includes a base cutting blade and at least one mulching cutting blade. The base cutting blade includes a first cutting edge formed on one edge, extending inward from a first end thereof and a second cutting edge formed on an opposing edge, extending inward from a second end thereof. A middle section of the base cutting blade may have any suitable hole (s) or opening pattern (s) to accommodate attachment to a drive shaft of a lawn mower. The at least one mulching cutting blade may be a single mulching cutting blade, which is bolted to the drive shaft, or two separate mulching cutting blades, which are attached to the base cutting blade with any suitable method, such as welding. A first mulching cutting blade includes a first mulching cutting edge and a second mulching cutting blade includes a second mulching cutting edge.

19 Claims, 4 Drawing Sheets

MULCHING LAWN MOWER BLADE

BACKGROUND OF THE INVENTION

1. Field of the Invention

The present invention relates generally to lawn care and more specifically to a mulching lawn mower blade, which is able to cut both grass and leaves into a fine mulch.

2. Discussion of the Prior Art

U.S. Pat. No. 5,259,176 to Kahamura et al. discloses a cotter device for lawn mower. U.S. Pat. No. 5,321,940 to Peterson discloses a multi-edge mower blade. U.S. Pat. No. 5,353,581 to Rouse et al. discloses a mulching blade including multiple edges. U.S. Pat. No. 11,641,795 to Xu et al. discloses a lawn mower. However, it appears that the prior art does not disclose a mulching lawn mower blade, which finely mulches leaves laying on top of grass.

Accordingly, there is a clearly felt need in the art for a mulching lawn mower blade, which is able to cut leaves laying on top of grass into a fine mulch, such that bagging the fine mulch is not required or possible.

SUMMARY OF THE INVENTION

The present invention provides a mulching lawn mower blade, which is able to cut both grass and leaves into a fine mulch. The mulching lawn mower blade preferably includes a base cutting blade and at least one mulching cutting blade. The base cutting blade includes a first cutting edge formed on one edge, extending inward from a first end thereof and a second cutting edge formed on an opposing edge, extending inward from a second end thereof. A first blade area behind the first cutting edge includes an upward curving shape. A second blade area behind the second cutting edge includes a second upward curving shape. A middle section of the base cutting blade may have any suitable hole (s) or opening pattern (s) to accommodate attachment to a drive shaft of a lawn mower or a riding lawn mower (tractor). A length of the first and second cutting edges are preferably between 25%-33% of a length of the entire base cutting blade. The total cutting length of the first and second cutting edges is 50%-66% of the length of the base cutting blade.

The at least one mulching cutting blade may be a single mulching cutting blade, which is bolted to the drive shaft, or two separate mulching cutting blades, which are attached to the base cutting blade with any suitable method, such as welding. A first mulching cutting blade includes a first mulching cutting edge and a second mulching cutting blade includes a second mulching cutting edge. The lengths of the first and second mulching cutting edges are preferably equal to a length of the first and second cutting edges. Fronts of the first and second mulching cutting edges may be flush with the fronts of the first and second cutting edges, or offset inward as much as about 0.12 inches. A depth of the first and second mulching cutting blades is less than a depth of the base cutting blade. A first mulching blade area behind the first mulching cutting edge includes a first upward curving shape. A second mulching blade area behind the second mulching cutting edge includes a second upward curving shape. A radius of curvature of the first and second mulching blade areas is preferably greater than a radius of curvature of the first and second blade areas. An acute angle is preferably formed between a front of the first and second cutting edge and a front of the first and second mulching cutting edges. A distance between a top of the first and second blade areas and a bottom of the first and second mulching blade areas is about 0.62 inches, or between 0.56 to 0.69 inches.

Some base cutting blades include first and second cutting edges with first and second offset portions. The first and second mulching cutting edges also include first and second mulching offset portions. A distance between a top of the first and second offset portions and a bottom of the first and second mulching offset portions is about 0.62 inches, or between 0.56 to 0.69 inches.

Accordingly, it is an object of the present invention to provide a mulching lawn mower blade, which is able to cut leaves laying on top of grass into a fine mulch, such that bagging the fine mulch is not possible.

These and additional objects, advantages, features and benefits of the present invention will become apparent from the following specification.

DETAILED DESCRIPTION OF THE PREFERRED EMBODIMENTS

Figure 1:
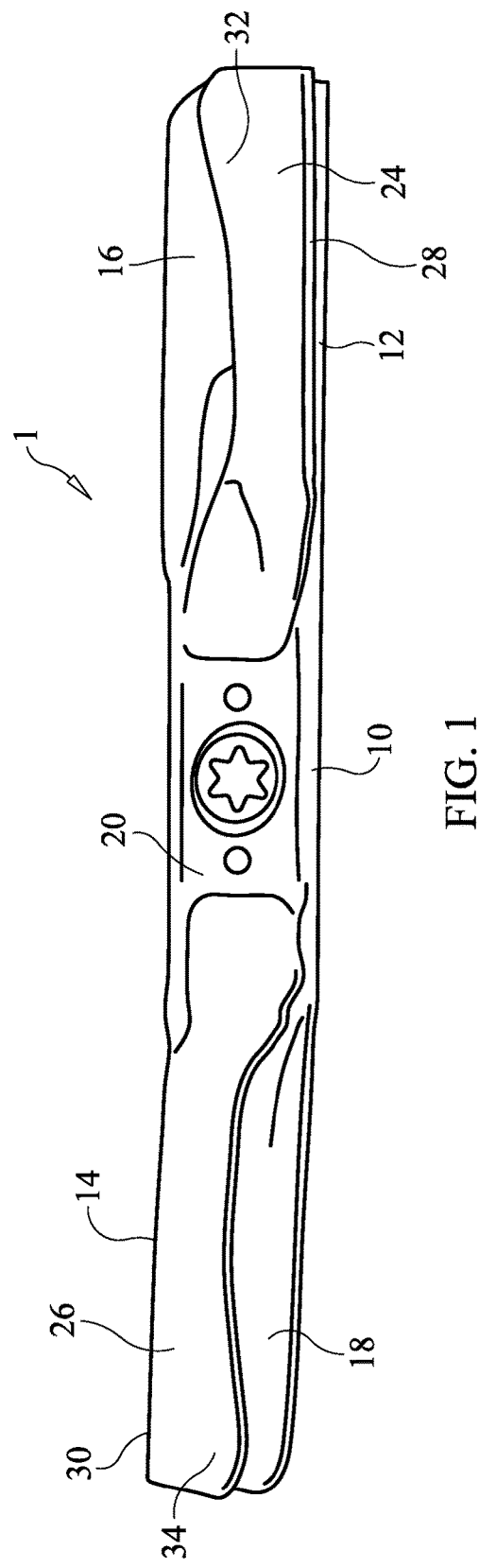
FIG. 1 is a top view of a mulching lawn mower blade with two separate mulching blades in accordance with the present invention.
Figure 2:
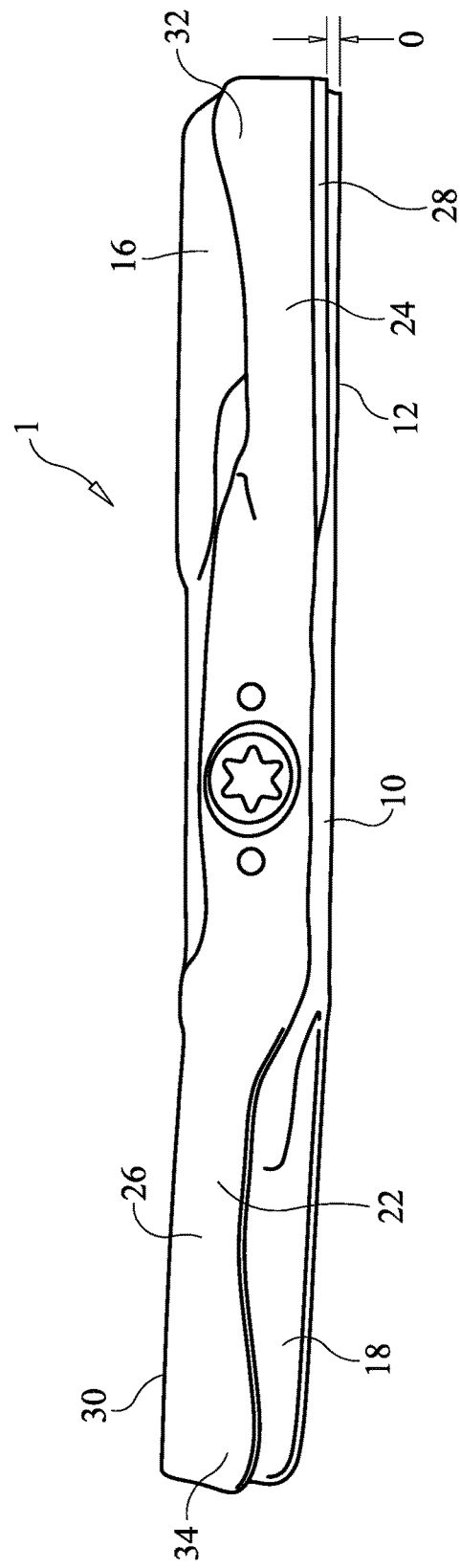
FIG. 2 is a top view of a mulching lawn mower blade with a single mulching blade in accordance with the present invention.
Figure 3:
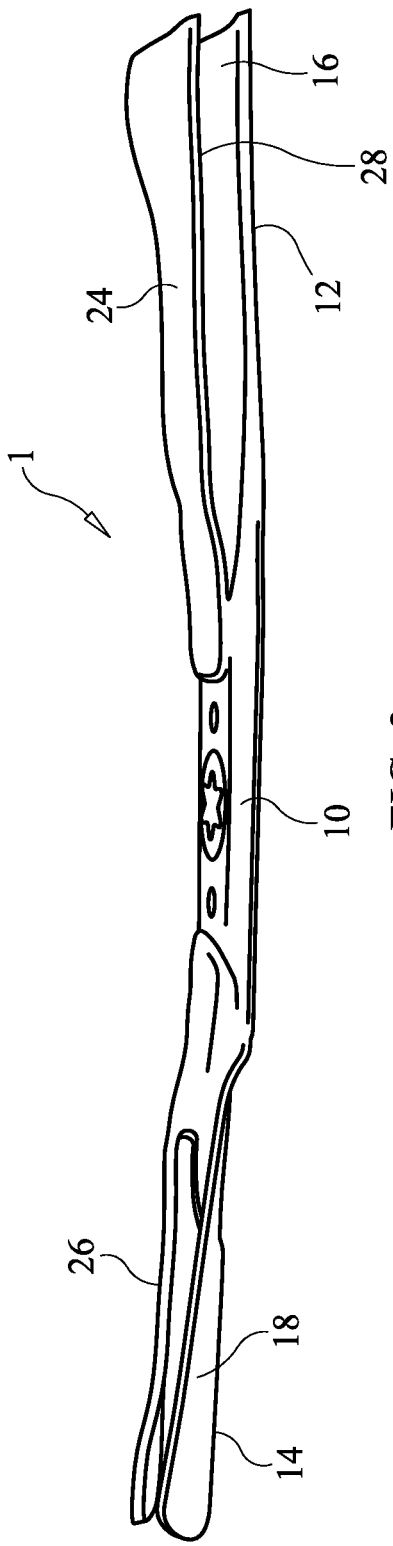
FIG. 3 is a front view of a mulching lawn mower blade in accordance with the present invention.
Figure 4:
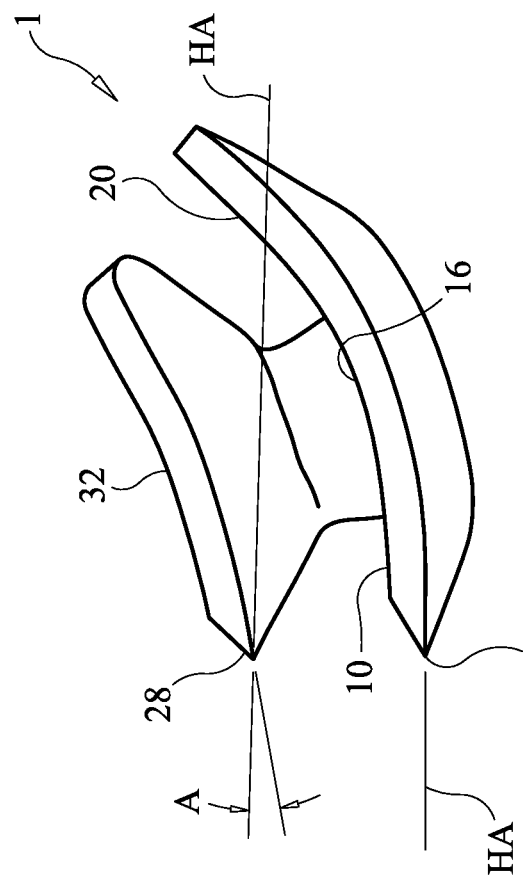
FIG. 4 is an end view of a mulching lawn mower blade in accordance with the present invention.

With reference now to the drawings, and particularly to FIG. 1, there is shown a top view of a mulching lawn mower blade 1. With reference to FIGS. 3-4, the mulching lawn mower blade 1 preferably includes a base cutting blade 10 and at least one mulching cutting blade. The base cutting blade 10 includes a first cutting edge 12 formed on one edge, extending inward from a first end thereof and a second cutting edge 14 formed on an opposing edge, extending inward from a second end thereof. A first blade area 16 behind the first cutting edge includes a first upward curving shape. A second blade area 18 behind the second cutting edge includes an upward curving shape. A middle section 20 of the base cutting blade 10 may have any suitable hole (s) and/or opening pattern (s) to accommodate attachment to a drive shaft of a lawn mower. A length of the first and second cutting edges are preferably between 25%-33% of a length of the entire base cutting blade 10. The total cutting length of the first and second cutting edges 12, 14 are preferably 50%-66% of the length of the base cutting blade. With reference to FIG. 2, the at least one mulching cutting blade may be a single mulching cutting blade 22, which is bolted to a drive shaft of a lawn mower or a riding lawn mower, or two separate mulching cutting blades 24, 26, which are attached to the base cutting blade 10 with any suitable method, such as welding. The first mulching cutting blade 24 includes a first mulching cutting edge 28 and the second mulching cutting blade 26 includes a second mulching cutting edge 30. The lengths of the first and second mulching cutting edges 28, 30 are preferably equal to a length of the first and second cutting edges 12, 14. Fronts of the first and second mulching cutting edges 28, 30 may be flush with the fronts of the first and second cutting edges 12, 14, or preferably offset by a dimension "O" inward as much as about 0.12 inches, but other dimensions could also be used. A depth of the first and second mulching cutting blades 24, 26 is preferably less than a depth of the base cutting blade 10. A first mulching blade area 32 behind the first mulching cutting edge 26 includes a first upward curving shape. A second mulching blade area 34 behind the second mulching cutting edge 30 includes a second upward curving shape. A radius of curvature of the first and second mulching blade areas 32, 34 are preferably greater than a radius of curvature of the first and second blade areas 16, 18 of the base cutting blade 10. An acute angle "A" relative to a horizontal axis "HA" is preferably formed between a bottom of the first and second cutting edges 12, 14 and a bottom of the first and second mulching cutting edges. A distance between a top of the first and second blade areas 16, 18 and a bottom of the first and second mulching blade areas 32, 34 is preferably about 0.62 inches, or between 0.56 to 0.69 inches, but other dimensions could also be used. A height of the first and second mulching blade areas 32, 34 is less than a height of the first and second blade areas 16, 18. An overall height of the first and second mulching blade areas 32, 34 is greater than a height of the first and second mulching cutting edges 28, 30.

Figure 5:
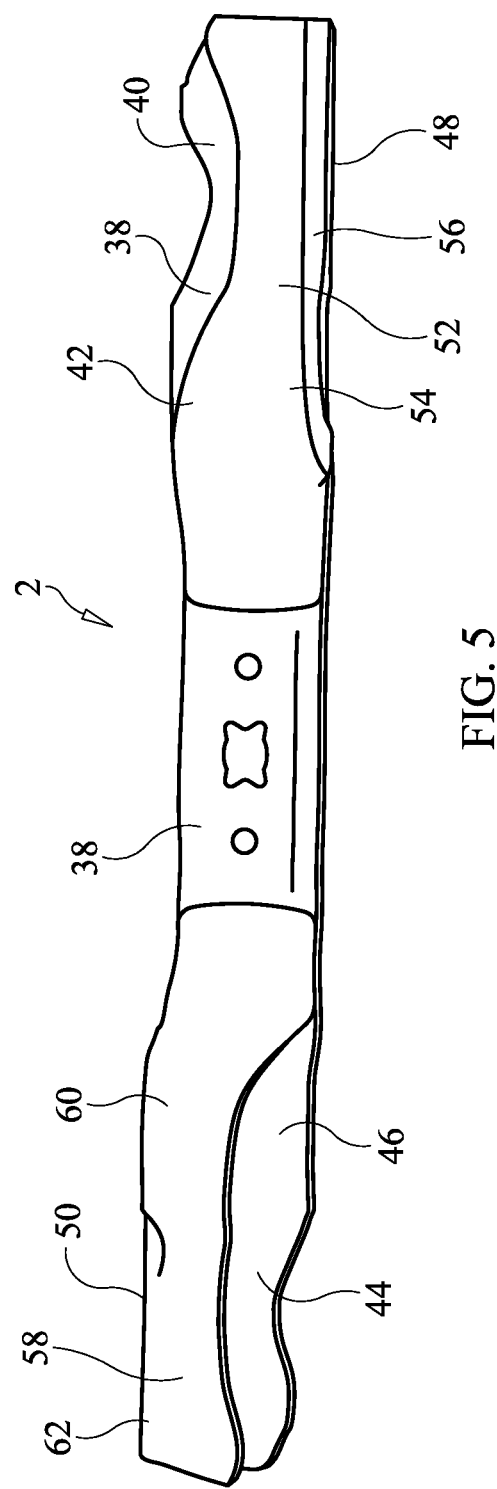
FIG. 5 is a top view of a mulching lawn mower blade with a base blade having offset portions in accordance with the present invention.
Figure 6:
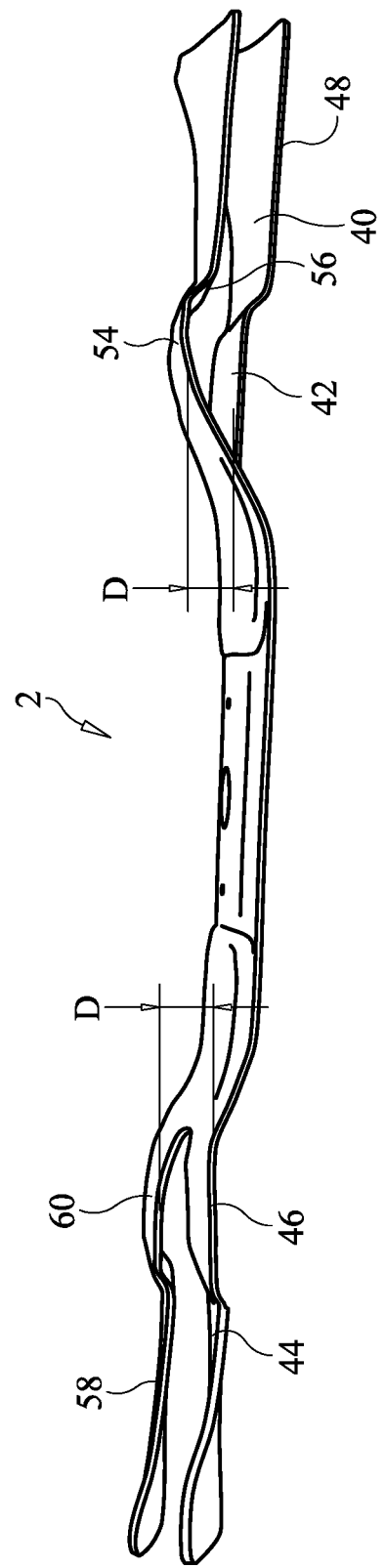
FIG. 6 is a front view of a mulching lawn mower blade with a base blade having offset portions in accordance with the present invention.
Figure 7:
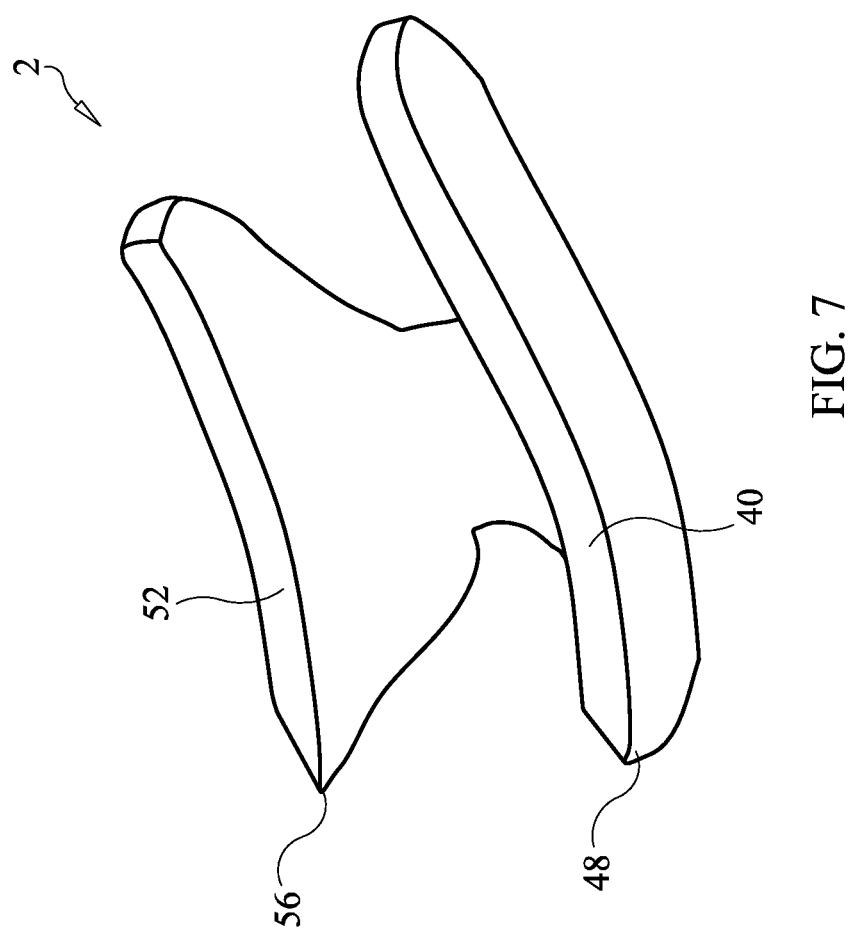
FIG. 7 is an end view of a mulching lawn mower blade with a base blade having offset portions in accordance with the present invention.

With reference to FIGS. 5-7, a mulching lawn mower blade 2 includes a base blade 38 having a first cutting blade 40 with a first offset portion 42 and a second cutting blade 44 with a second offset portion 46. A first cutting edge 48 is formed on the first cutting blade 40 and a second cutting edge 50. A first mulching cutting blade 52 includes a first mulching offset portion 54 and a first mulching cutting edge 56. A second mulching cutting blade 58 includes a second mulching offset portion 60 and a second mulching cutting edge 62. A distance "D" between a top of the first and second offset portions 42, 46 and a bottom of the first and second mulching offset portions 54, 60 is about 0.62 inches, or between 0.56 to 0.69 inches.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A mulching lawn mower blade, comprising:
a base cutting blade includes a first cutting edge formed on one edge, extending inward from a first end thereof, a second cutting edge formed on an opposing edge, extending inward from a second end thereof, a first blade area formed behind the first cutting edge includes a first upward curving shape, a second blade area formed behind the second cutting edge includes a second upward curving shape; and
a first mulching cutting blade is retained on a first end of said base cutting blade, said first mulching cutting blade includes a first mulching cutting edge, a second mulching cutting blade is retained on a second end of said base cutting blade, said second mulching cutting blade includes a second mulching cutting edge, a first mulching blade area formed behind said first mulching cutting edge includes a first mulching upward curving shape, a second mulching blade area formed behind said second mulching cutting edge includes a second mulching upward curving shape, a radius of curvature of said first and second mulching blade areas is greater than a radius of curvature of said first and second blade areas.

2. The mulching lawn mower blade of claim 1,
at least one opening is formed through a middle section of said base cutting blade for attachment to a drive shaft of a lawn mower or riding lawn mower.

3. The mulching lawn mower blade of claim 1, wherein:
lengths of said first and second mulching cutting edges are equal to lengths of said first and second cutting edges.

4. The mulching lawn mower blade of claim 1, wherein:
fronts of said first and second mulching cutting edges may be flush with the fronts of said first and second cutting edges, or offset by a dimension between 0-0.12 inches.

5. The mulching lawn mower blade of claim 1, wherein:
a distance between a top of said first and second blade areas and a bottom of said first and second mulching blade areas is between 0.56 to 0.69 inches.

6. A mulching lawn mower blade, comprising:
a base cutting blade includes a first cutting edge formed on one edge, extending inward from a first end thereof, a second cutting edge formed on an opposing edge, extending inward from a second end thereof, a first blade area formed behind the first cutting edge includes a first upward curving shape, a second blade area formed behind the second cutting edge includes an upward curving shape; and
a mulching cutting blade is retained on said base cutting blade, said mulching cutting blade includes a first mulching cutting edge on a first end and a second mulching cutting blade on a second end, a first mulching blade area formed behind said first mulching cutting edge includes a first mulching upward curving shape, a second mulching blade area formed behind said a second mulching cutting edge includes a second mulching upward curving shape, a radius of curvature of said first and second mulching blade areas is greater than a radius of curvature of said first and second blade areas.

7. The mulching lawn mower blade of claim 6, wherein:
at least one opening is formed through a middle section of said base cutting blade for attachment to a drive shaft of a lawn mower or riding lawn mower.

8. The mulching lawn mower blade of claim 6, wherein:
a total cutting length of said first and second cutting edges are between 50%-66% of a length of said base cutting blade.

9. The mulching lawn mower blade of claim 6, wherein:
lengths of said first and second mulching cutting edges are equal to lengths of said first and second cutting edges.

10. The mulching lawn mower blade of claim 6, wherein:
fronts of said first and second mulching cutting edges may be flush with the fronts of said first and second cutting edges, or offset by a dimension between 0-0.12 inches.

11. The mulching lawn mower blade of claim 6, wherein:
a distance between a top of said first and second blade areas and a bottom of said first and second mulching blade areas is between 0.56 to 0.69 inches.

12. A mulching lawn mower blade, comprising:
a base cutting blade includes a first cutting edge formed on one edge, extending inward from a first end thereof, a second cutting edge formed on an opposing edge, extending inward from a second end thereof, a first blade area behind the first cutting edge includes a first upward curving shape, a second blade area behind the second cutting edge includes an upward curving shape; and a mulching cutting blade is retained on said base cutting blade, a first mulching cutting edge is formed on a first end of said mulching cutting blade, a second mulching cutting edge is formed on a second end of said mulching cutting blade, a first mulching blade area behind said first mulching cutting edge includes a first mulching upward curving shape, a second mulching blade area behind said second mulching cutting edge includes a second mulching upward curving shape, bottoms of said first and second blade areas are located in a horizontal plane and a portion of said bottoms are parallel to the horizontal plane, wherein an acute angle is formed between said bottoms of said first and second blade areas and bottoms of first and second mulching blade areas, a radius of curvature of said first and second mulching blade areas is greater than a radius of curvature of said first and second blade areas.

13. The mulching lawn mower blade of claim 12, wherein a total cutting length of said first and second cutting edges are between 50%-66% of a length of said base cutting blade.

14. The mulching lawn mower blade of claim 12, wherein:
lengths of said first and second mulching cutting edges are equal to lengths of said first and second cutting edges.

15. The mulching lawn mower blade of claim 12, wherein:
fronts of said first and second mulching cutting edges may be flush with the fronts of said first and second cutting edges, or offset by a dimension between 0-0.12 inches.

16. The mulching lawn mower blade of claim 12, wherein:
a distance between a top of said first and second blade areas and a bottom of said first and second mulching blade areas is between 0.56 to 0.69 inches.

17. The mulching lawn mower blade of claim 1, wherein:
said first mulching cutting edge includes a first vertical offset portion, said second mulching cutting edge includes a second vertical offset portion.

18. The mulching lawn mower blade of claim 6, wherein:
said first mulching cutting edge includes a first vertical offset portion, said second mulching cutting edge includes a second vertical offset portion.

19. The mulching lawn mower blade of claim 12, wherein:
said first mulching cutting edge includes a first vertical offset portion, said second mulching cutting edge includes a second vertical offset portion.

\* \* \* \* \*